Sept. 5, 1950     C. BIRDSEYE     2,521,442
FOOD DEHYDRATION
Filed April 5, 1944
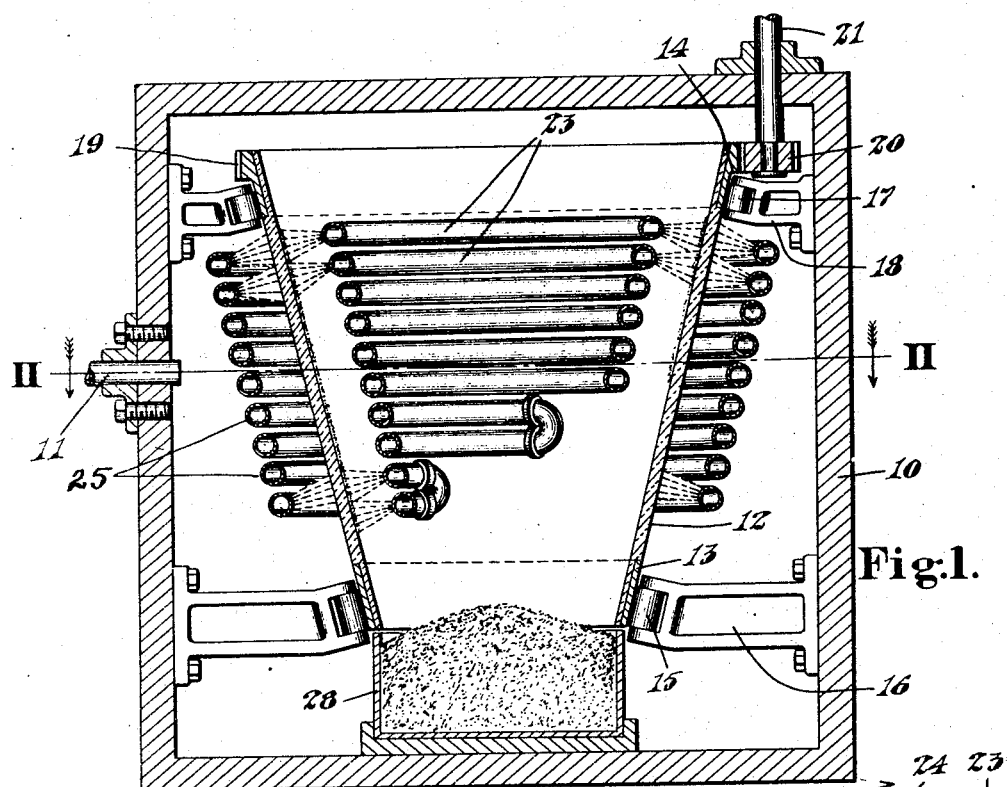
Fig. 1.
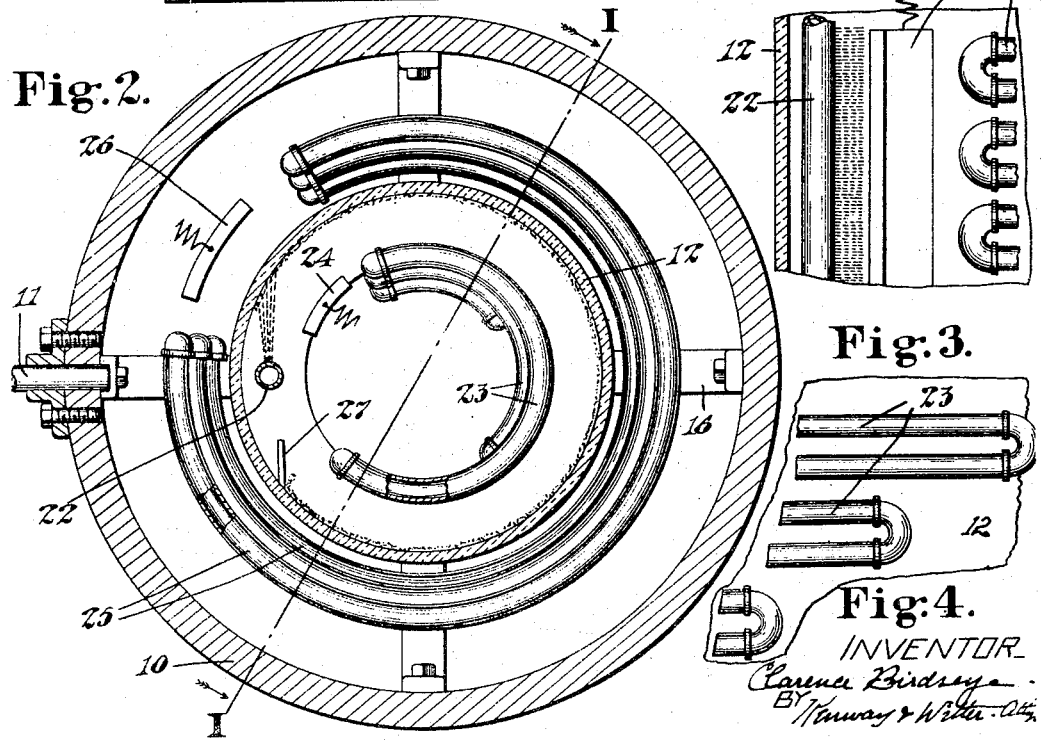
Fig. 2.
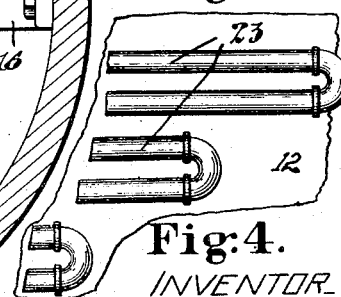
Fig. 3.
Fig. 4.
INVENTOR
Clarence Birdseye
BY Kenway & Witter Attys Patented Sept. 5, 1950

2,521,442

UNITED STATES PATENT OFFICE 2,521,442

FOOD DEHYDRATION

Clarence Birdseye, Gloucester, Mass., assignor to Dehydration, Inc., Gloucester, Mass., a corporation of Massachusetts Application April 5, 1944, Serial No. 529,623

7 Claims. (Cl. 159—6)

This invention relates to the dehydration of foods under conditions of less than atmospheric pressure. It embraces a novel process characterized by distributing a liquid or liquid-containing food in a thin layer exposed to radiant energy directed to both surfaces of the layer. It includes within its scope the novel apparatus herein shown as employed in carrying out the process of my invention.

In general it is the object of my invention to make available for the dehydrating industry a highly efficient process whereby foods may be rapidly dehydrated to produce a uniform product without subjecting the food to excessive heating and, in general, to produce a dehydrated product which upon rehydration will retain to an unusual degree the natural flavor of the fresh food together with the vitamins, mineral salts, color, texture and other desirable characteristics of the fresh food.

I have discovered that these highly valuable results may be achieved by distributing the food in a layer or film so disposed that it may be subjected on both surfaces to radiant energy. This may be effected in a novel manner by employing a rotary annular carrier of transparent material, such as a cylinder or cone of glass, and spraying the food upon a moving surface of the carrier to which it adheres in the desired layer or film formation. It may thus be exposed internally and externally to radiant energy in the form of infra-red rays, or a high frequency electric field, or both, in any desired combination.

Going more into detail, it will be seen that the novel method of my invention is in part characterized by drying a food layer or film while in contact with a transparent surface or while in contact with a transparent carrier which is non-conductive of electricity. As herein shown, the liquid or liquid-containing food is sprayed upon the surface of the carrier and in this step the spray may be directed through a zone of radiant energy of infra-red rays or high frequency alternating field. Moisture is removed to some extent in this preliminary spraying step and then the remainder of the contained moisture is removed while the product layer is advanced upon the surface of the moving carrier. As a further feature I propose to supply radiant energy to the product layer in quantities gradually decreasing as the moisture is evaporated therefrom while the product remains upon or against the carrier surface in a layer of substantially uniform thickness until it has been dehydrated to the desired degree. In this manner I am enabled to subject the food in process of dehydration to a particularly effective and well distributed application of radiant energy, for not only are the inner and outer surfaces of the product layer subjected to direct radiation, but the carrier itself is also heated by radiant energy and so supplies heat to the product layer by conduction.

While the process of my invention may be carried out with the assistant of apparatus of many different forms, I have disclosed herein one which is satisfactory and has the advantages of compactness of structure and efficiency of mechanical operation. An important feature thereof is a drum of Pyrex glass or other suitable transparent material arranged for rotation within a vacuum chamber. Means are provided for spraying the liquid or liquid-containing food against one surface of this carrier and heating means are provided both inside and outside the drum for directing radiant energy upon the drum and the food layer adhering thereto. I have found it advantageous to make the transparent drum somewhat conical in shape and to utilize as heating means circumferentially arranged steam pipes and electrodes arranged in circuit with a high frequency alternating generator. An advantage in having the drum in the form of an inverted truncated cone is that when such a drum is rotated at the proper speed, the layer of liquid applied to the inner face of the drum will be held thereagainst by centrifugal force and so prevented from moving downwardly across the face of the drum during the early stages of the drying process.

Other features and characteristics of the invention will be best understood and appreciated from the following description of the apparatus above outlined and of the manner in which it is employed in carrying out the process of my invention, all as illustrated in the accompanying drawings in which:

Fig. 1 is a view of the apparatus in longitudinal section on the plane 1—1 of Fig. 2;

Fig. 2 is a plan view of the apparatus as seen from above;

Fig. 3 is a fragmentary view showing an inner portion of the apparatus; and

Fig. 4 is a fragmentary view showing the arrangement of steam piping at one end of the system.

The apparatus is enclosed within a substantially gas-tight cylindrical container 10 whose walls may be suitably insulated and provided with convenient sealed openings, not shown, by which access to the interior of the casing may be had when desired or for the purpose of removing the dehydrated product. A suction pipe 11 leads to the interior of the casing and by this means the gaseous atmosphere within the casing may be reduced to and maintained at the desired pressure, for example, at a pressure less than 10 inches of mercury.

Symmetrically disposed within the container 10 is the rotary carrier which is herein shown as a cone 12 of transparent Pyrex glass mounted to rotate about a vertical axis. The smaller and lower end of the cone 12 fits into a metal ring 13 and the upper and larger end of the cone correspondingly fits into a metal ring 14. The lower ring 13 is supported for rotation by a series of inclined rollers 15 carried by radially disposed brackets 16, and the upper ring 14 is correspondingly supported by rollers 17 carried by brackets 18. A sufficient number of brackets are provided to support the rotary carrier symmetrically for smooth rotation. The upper ring 14 is provided upon its exterior face with a circular rack 19 with outwardly directing teeth and these mesh with a pinion 20 fast to the lower end of a vertical shaft 21 which projects downwardly through a suitable stuffing box in the top of the casing. The shaft 21 and its pinion 20 thus supply means for rotating the transparent conical carrier within the casing at any desired speed.

The liquid or moisture-containing food to be dehydrated is supplied in fluid form to the rotary carrier by a pipe 22 which passes downwardly through a stuffing box in the top of the casing. Within the casing the pipe 22 extends downwardly into proximity to the inclined inner face of the cone 12, being provided with spray outlet orifices which are directed obliquely so that the food product leaving the pipe 22 will be sprayed against the surface of the cone at an angle of about 30° and in a spray extending from the top to the bottom of the cone. The food is then spread in a thin adherent layer of uniform thickness upon the inner face of the cone.

Radiant energy is supplied to the outer surface of the transparent cone and to the outer surface of the food layer on the inner surface of the cone by a series of circumferentially arranged steam pipes 25. These pipes 25 are horizontally disposed and encircle the cone 12 in vertically spaced relation except for a gap at one side which is occupied by an electrode bar 26 extending in parallel relation to the cone 12 adjacent to its outer surface.

Similarly, radiant energy is supplied to the inner surface of the product layer by a series of steam pipes 23. These are disposed in substantially parallel relation to the pipes 25 and extend circumferentially within the cone 12. They are interrupted at one side to form a space for the inner electrode bar 24 which is disposed opposite and parallel to the outer electrode bar 26 already mentioned. The inner steam pipes 23 do not correspond throughout the series in length with the outer steam pipes 25 but terminate in graduated length in a downwardly extending oblique line. This arrangement is such that the quantity of radiant energy supplied to the inner surface of the food product layer decreases progressively about the carrier thus supplying a decreasing quantity of energy as the product layer becomes drier and drier.

It will be noted that the sprayed food product issuing from the pipe 22 passes obliquely through the high frequency zone of radiant energy maintained between the electrode bars 24 and 26 and to some extent through the zone of infra-red radiant energy generated by the two series of pipes 23 and 25. This, of course, effects both dielectric and radiant heating and consequently rapid evaporation of a substantial amount of moisture from the food product while it is in spray form on its way to the surface of the cone 12.

A scraping blade 27 bears against the inner surface of the cone 12 along the line located slightly in advance of the spray pipe 22. This serves to scrape and remove the dehydrated food product layer from the inner surface of the cone after it has completed its dehydrating movement and before it can be advanced again within range of the spray pipe. The dehydrated product, of course, falls downwardly by gravity, passing out the lower end of the cone where it may be collected conveniently in a receptacle 28 provided for that purpose.

From the foregoing description it will be seen that the liquefied food is distributed in a thin continuous annular film upon the conical carrier 12 and is then subjected to radiant heat throughout the whole area of both its inner and outer surfaces. The heating of the food on the carrier 12 is supplemented or preceded by the heating of the food in spray form as it passes to the carrier and both steps are carried out under pressure substantially below atmospheric.

While a transparent glass carrier is not ordinarily substantially heated under the conditions described it is within the scope of the invention to employ a carrier of black or opaque glass in order to absorb radiant energy supplied from sources exterior to the carrier and thus to transmit the absorbed heat to the product by conduction.

Having thus disclosed my invention and described an illustrative and preferred manner of putting it into practice, I claim as new and desire to secure by Letters Patent:

1. Dehydration apparatus comprising a conical carrier of dielectric material mounted to rotate about a vertical axis, means for rotating said carrier, means for subjecting an area thereof to a high frequency electric field, and means for supplying a liquefied food to the inner downwardly inclined face of the carrier where it is maintained by centrifugal force in the rotation of the carrier.

2. Dehydration apparatus comprising a conical carrier of transparent material mounted to rotate about a vertical axis, sources of heat disposed concentrically with respect to both faces of the rotary carrier, means for spraying a liquid food product to form an annular layer on the inner face of the carrier where it is maintained by centrifugal force in the rotation of the carrier, and electrodes for subjecting the sprayed food product to a high frequency electric field.

3. Dehydration apparatus comprising a conical carrier of transparent material, inclined rollers for supporting the carrier for rotation while leaving its interior unobstructed, mechanism for driving the carrier about a vertical axis, a duct for spraying a product in fluid form in an adhesive layer upon the inner conical surface of the carrier, and concentric heating elements disposed both inside and outside the wall of the carrier.

4. Dehydration apparatus of the character described in claim 3, in which the heating elements comprise steam pipes arranged in concentric circular coils.

5. Dehydration apparatus of the character described in claim 3 in which the heating elements comprise elongated electrodes disposed in parallel relation to the wall of the carrier.

6. Dehydration apparatus of the character described in claim 3 in which the fluid food which is sprayed upon the inner surface of the drum is held thereon by centrifugal force and so prevented from running down in the early stages of the drying process.

7. A food dehydrating process which includes the steps of spraying food in fluid form through a high frequency electrical field in which the food is dielectrically heated, then spreading the sprayed food in a thin layer upon a transparent carrier, and subjecting it to radiant heating from both sides of the layer.

CLARENCE BIRDSEYE.

REFERENCES CITED

The following references are of record in the file of this patent:

UNITED STATES PATENTS

| Number | Name | Date |
|---|---|---|
| 888,257 | Passburg | May 19, 1908 |
| 1,068,898 | Henri et al. | July 29, 1913 |
| 1,557,921 | Buel | Oct. 20, 1925 |
| 2,042,145 | Darrah | May 26, 1936 |
| 2,132,897 | Gentele | Oct. 11, 1938 |
| 2,282,070 | Mahannah | May 5, 1942 |
| 2,304,958 | Rouy | Dec. 15, 1942 |
| 2,340,354 | Wells | Feb. 1, 1944 |
| 2,350,934 | Schutte | June 6, 1944 |
| 2,360,108 | Christie | Oct. 10, 1944 |
| 2,360,257 | Muller et al. | Oct. 10, 1944 |

FOREIGN PATENTS

| Number | Country | Date |
|---|---|---|
| 494,847 | Great Britain | Nov. 2, 1938 |